United States Patent
Pineda Amo

(10) Patent No.: US 9,476,407 B2
(45) Date of Patent: Oct. 25, 2016

(54) METHOD OF OPERATING A WIND TURBINE

(71) Applicant: ALSTOM RENOVABLES ESPAÑA, S.L., Barcelona (ES)

(72) Inventor: Isaac Pineda Amo, Sant Cugat del Vallés (ES)

(73) Assignee: ALSTOM RENOVABLES ESPAÊA, S.L., Barcelona (ES)

( * ) Notice: Subject to any disclaimer, the term of this patent is extended or adjusted under 35 U.S.C. 154(b) by 371 days.

(21) Appl. No.: 14/225,340

(22) Filed: Mar. 25, 2014

(65) Prior Publication Data

US 2014/0297052 A1    Oct. 2, 2014

(30) Foreign Application Priority Data

Mar. 27, 2013    (EP) .................................. 13382118

(51) Int. Cl.
*F03D 7/02*    (2006.01)
*F03D 7/04*    (2006.01)

(52) U.S. Cl.
CPC ........... *F03D 7/0224* (2013.01); *F03D 7/0276* (2013.01); *F03D 7/042* (2013.01); *F03D 7/044* (2013.01); *F03D 7/046* (2013.01); *F05B 2260/96* (2013.01); *F05B 2270/322* (2013.01); *F05B 2270/327* (2013.01); *F05B 2270/807* (2013.01); *Y02E 10/723* (2013.01)

(58) Field of Classification Search
CPC .. F03D 7/0224; F03D 7/0276; F03D 7/0296; F03D 7/042; F05B 2260/80; F05B 2260/96; F05B 2270/327; F05B 2270/334; F05B 2270/706
See application file for complete search history.

(56) References Cited

U.S. PATENT DOCUMENTS 8,044,529 B2 * 10/2011 Egedal .................. F03D 7/0224
                                                    290/44
2010/0135789 A1    6/2010 Zheng et al.
2012/0098265 A1 *  4/2012 Skaare .................. F03D 7/0272
                                                    290/53

FOREIGN PATENT DOCUMENTS

| EP | 2 133563 | 12/2009 |
| EP | 2 447 527 | 5/2012 |
| GB | 2023237 | 12/1979 |
| WO | WO 2007/010322 | 1/2007 |
| WO | WO 2010/060772 | 6/2010 |

OTHER PUBLICATIONS

European Search Report for EP 13382118, mailed Sep. 12, 2013, 9 pgs.
Bossanyi et al., "The Design of Closed Loop Controllers for Wind Turbines", Wind Energy vol. 3, pp. 149-163 (2000).

* cited by examiner

*Primary Examiner* — Crystal J Barnes-Bullock
(74) *Attorney, Agent, or Firm* — Squire Patton Boggs (US) LLP

(57) ABSTRACT

In a first aspect, the present invention provides a method of operating a wind turbine having a rotor with a plurality of blades, a nacelle, one or more pitch systems for pitching the blades, a system for determining a speed of the rotor, and a system for determining a fore-aft speed of the nacelle. The method comprises determining the speed of the rotor, determining the fore-aft speed of the nacelle, and calculating a difference between the determined speed of the rotor and a predefined speed of reference of the rotor. After, pitch commands are obtained by performing a PID control of this calculated difference of speeds, said PID control being tuned for adapting the sensitivity of the PID control as a function of the determined fore-aft speed of the nacelle. Then, the one or more pitch systems pitch the blades in accordance with said obtained pitch commands.

20 Claims, 5 Drawing Sheets

METHOD OF OPERATING A WIND TURBINE

This application claims the benefit of European Patent Application EP 13382118.1 filed 27 Mar. 2013, the disclosure of which is hereby incorporated by reference in its entirety for all purposes.

The present invention relates to a method of operating a wind turbine, and to a wind turbine suitable for performing such a method.

BACKGROUND ART

Modern wind turbines are commonly used to supply electricity into the electrical grid. Wind turbines of this kind generally comprise a tower and a rotor arranged on the tower. The rotor, which typically comprises a hub and a plurality of blades, is set into rotation under the influence of the wind on the blades. Said rotation generates a torque that is normally transmitted through a rotor shaft, either directly or through the use of a gearbox, to a generator. This way, the generator produces electricity which can be supplied to the electrical grid.

A variable speed wind turbine may typically be controlled by varying the generator torque and the pitch angle of the blades. As a result, aerodynamic torque, rotor speed and electrical power will vary.

In a first operational range, from the cut-in wind speed to a first wind speed (e.g. approximately 5 or 6 m/s), the rotor may be controlled to rotate at a substantially constant speed that is just high enough to be able to accurately control it. The cut-in wind speed may be e.g. approximately 3 m/s.

In a second operational range, from the first wind speed (e.g. approximately 5 or 6 m/s) to a second wind speed (e.g. approximately 8.5 m/s), the objective is generally to maximize power output while maintaining the pitch angle of the blades constant so as to capture maximum energy. In order to achieve this objective, the generator torque and rotor speed may be suitably varied.

In a third operational range, which starts at reaching nominal rotor rotational speed and extends until reaching nominal power, the rotor speed may be kept constant, and the generator torque may be varied to such effect. In terms of wind speeds, this third operational range extends substantially from the second wind speed to the nominal wind speed e.g. from approximately 8.5 m/s to approximately 11 m/s.

In a fourth operational range, which may extend from the nominal wind speed to the cut-out wind speed (for example from approximately 11 m/s to 25 m/s), the blades may be rotated ("pitched") to maintain the aerodynamic torque delivered by the rotor substantially constant. In practice, the pitch may be actuated such as to maintain the rotor speed substantially constant. At the cut-out wind speed, the wind turbine's operation is interrupted.

In the first, second and third operational ranges, i.e. at wind speeds below the nominal wind speed (the sub-nominal zone of operation), the blades are normally kept in a constant pitch position, namely the "below rated pitch position". Said default pitch position may generally be close to a 0° pitch angle. The exact pitch angle in "below rated" conditions however depends on the complete design of the wind turbine. And in the supra-nominal zone, the pitch angle of the blades is changed in reaction to a change in rotor speed.

If a sudden wind gust occurs, i.e. a significant increase in wind speed in a relatively short time (extreme conditions), due to the inertia of the rotor, the rotor speed will not immediately increase. As a consequence, also the pitch system will not immediately react to the increase in wind speed. With the same pitch angle, stall may occur in the wind turbine blades, since the angle of attack of the blades may be above a critical angle of attack (because the wind speed changes and the rotor speed cannot track said change because of its own inertia).

Thus, in order to maintain an optimum angle of attack at the moment of the sudden wind gust, the pitch angle should be increased. Nevertheless, as the pitch system depends on the rotor inertia, it cannot track a sudden wind change, so blade pitch remains somewhat stuck, thus resulting in a large angle of attack. Depending on the precise effects of the wind, and the inertia of the rotor, it may be that the rotor speed even decreases a little bit, due to the separation of the flow from the blades as stall occurs. In response to this decrease in rotor speed, the pitch system will reduce the pitch angle more, thus aggravating the situation by further increasing the angle of attack.

The above situation (sudden wind gust) may be particularly troublesome in case of e.g. a Mexican hat wind gust. Mexican hat wind gusts are defined in the IEC 61400-1 2nd edition 1999-02 standard, since they may be particularly dangerous wind gusts. This standard defines Mexican hat wind gusts at various speeds, and at various azimuth angles.

The loads a wind turbine suffers during such a wind gust are severe and may define design loads for the wind turbine. This is due to the decrease in wind speed, before the high increase in wind speed. When the wind speed decreases, the pitch system tries to adapt the blades to this decrease (the blades are initially rotated in such a way to increase the aerodynamic torque). With the pitch adaptation still on going, a significant increase in wind speed occurs. The aerodynamic torque and the thrust force on the hub can thus be very high. The pitch of the wind turbine will then start to be adapted to these new wind conditions. However, the wind speed keeps increasing and due to the inertia of the system, the pitch can possibly not be adapted quickly enough, thus leading to the wind turbine potentially stalling and suffering increased loads. A typical pitch system may have an inherent pitch limitation of approximately 5°/second. Such a pitch rate may in principle be fast enough to respond to wind variations occurring during operation of the wind turbine. In general, the limiting factor in operation of the pitch system may not be the pitch drive system but the means used to sense wind speed, i.e. rotor speed.

The international patent application WO2010060772 (A2) discloses a method for controlling and regulating an operational parameter of a wind turbine blade such as e.g. a blade pitch angle, a position of a flap, or other means for changing the aerodynamic surface of a blade. These are controlled on a wind turbine during operation with the purpose of reducing any extreme tower loads. Based on a measured acceleration of the nacelle, the velocity of the wind turbine nacelle and a position of the wind turbine nacelle relative to a running mean are determined and from these the actual operating situation. This actual operating situation is compared to a predetermined space of acceptable operating situations determined from a set of normal operating situations. A control strategy is then chosen from a predetermined set of strategies. The method further comprises the steps of defining a control function for the operational parameter based on the chosen predefined control strategy, and controlling at least one of the operational parameters of at least one of the wind turbine blades in accordance with the control function.

The method of WO2010060772 (A2) may perform transitions from one strategy to another requiring a sudden reaction of the wind turbine, which may cause the wind turbine to operate in a too stressed manner. This may cause e.g. a significant mechanical wear of the wind turbine. Besides, definition of transition thresholds and implementation of optimum methods to perform said transitions can also be quite troublesome. Furthermore, in a wind turbine configured to work at a given pitch rate, the required reaction may be constrained by said given pitch rate, such that the expected reaction may not be fully/optimally performed.

There still exists a need for a method of operating a wind turbine that at least partially reduces the aforementioned problems. It is an object of the present invention to fulfil such a need.

SUMMARY OF THE INVENTION

In a first aspect, the present invention provides a method of operating a wind turbine having a rotor with a plurality of blades, a nacelle, one or more pitch systems for pitching the blades, a system for determining a speed of the rotor, and a system for determining a fore-aft speed of the nacelle. The method comprises determining the speed of the rotor, determining the fore-aft speed of the nacelle, and calculating a difference between the determined speed of the rotor and a predefined speed of reference of the rotor. After, pitch commands are obtained by performing a PID control of this calculated difference of speeds, said PID control being tuned for adapting the sensitivity of the PID control as a function of the determined fore-aft speed of the nacelle. Then, the one or more pitch systems pitch the blades in accordance with said obtained pitch commands.

One option to cause a sooner pitch reaction to a sudden wind increase (in a e.g. Mexican hat wind gust) may be estimating the speed of the nacelle. During wind gusts, the rotor-nacelle-tower dynamics typically respond faster to the thrust force exerted by the wind than the drive train does to the aerodynamic torque. Therefore, if a significant increase of the nacelle speed is detected, the pitch systems may be driven to anticipate its reaction to said significant increase of the nacelle speed even when no variation on the generator speed has yet occurred. This anticipated reaction to a wind gust may cause e.g. the wind turbine to face the wind gust in more favourable conditions before stopping, i.e. higher pitch angles, lower rotor speed, etc. This way, extreme structural loads, mainly in blades and tower may be reduced.

A PID control comprises calculating an "error" value as the difference between a measured process variable (in this case: determined rotor speed) and a desired setpoint (in this case: rotor speed of reference). The PID control attempts to minimize the calculated error value by adjusting the inputs. Moreover, a PID control may have further inputs aimed at tuning the behaviour of the PID control in such a way that its sensitivity may be continuously adapted.

The proposed combination of using a PID control for pitching the blades of the wind turbine and continuously tuning the PID control as a function of the nacelle fore-aft speed may have diverse advantages. For example, sudden wind gusts may be faced with more favourable conditions because a more suitable reaction (by pitching the blades) may be performed sooner and faster. Another advantage may be that said reaction may be performed in a smoother manner, which may reduce e.g. mechanical wear of the wind turbine.

A further advantage may be that the overall control strategy may be easily changed, by simply changing as desired the function relating the PID sensitivity with the nacelle fore-aft speed. This easy adjustment of the control strategy may be performed in an existing turbine for regulating its behaviour and/or in new turbines to be installed. In the second case, the control strategy may be easily adjusted by "translating" the particular technical features of the new turbine into the corresponding tuning parameters to be provided to the PID control.

Tuning the PID control for adapting the sensitivity of the PID control as a function of the determined fore-aft speed of the nacelle may comprise obtaining a first gain as a function of the determined fore-aft speed of the nacelle. Then, the PID control may be tuned by applying the obtained first gain to the PID control.

The first gain may be equal to a first variable gain value which continuously increases from a lower value to a higher value of a first predefined range of gain values as the determined fore-aft speed of the nacelle increases from a lower value to a higher value of a first predefined range of fore-aft speed values. This first gain may be applied to the PID control by using the first gain to adapt its default proportional constant.

Tuning the PID control for adapting the sensitivity of the PID control as a function of the determined fore-aft speed of the nacelle may further comprise obtaining a second gain as a function of the determined fore-aft speed of the nacelle. Then, the PID control may be tuned by further applying the obtained second gain to the PID control.

The second gain may be equal to a second variable gain value which continuously decreases from a higher value to a lower value of a second predefined range of gain values as the determined fore-aft speed of the nacelle increases from a lower value to a higher value of a second predefined range of fore-aft speed values. This second gain may be applied to the PID control by using the second gain to adapt its default integral constant.

An aspect of providing to the PID control an "increasing" gain (to adapt its default proportional constant) and a "decreasing" gain (to adapt its default integral constant) may be that a greater weight is given to the proportional constant of the PID control, i.e. instantaneous error (difference between determined rotor speed and rotor speed of reference), while a smaller weight is given to the integral constant. This way, an improved (sooner and faster) reaction to extreme conditions can be performed.

The one or more pitch systems of the wind turbine may be adapted to follow pitch commands under a maximum pitch rate, such that the method may further comprise adapting said maximum pitch rate as a function of the determined fore-aft speed of the nacelle. An aspect of this may be that a possible constraint of the desired reaction due to a limited pitch rate may be avoided or attenuated. This may cause an even more improved (faster) reaction to extreme conditions.

The wind turbine may further comprise a system for determining blade pitch angles, such that the method may further comprise determining the blade pitch angles. The PID control may be further tuned in accordance with the determined blade pitch angles. An aspect of taking into account the current pitch angles to introduce changes in the pitch angles may be that the nonlinearity of aerodynamics may be suitably compensated during operation of the wind turbine.

The method may further comprise applying to the calculated difference of speeds at least one filter for removing, from the calculated difference of speeds, frequencies different from those theoretically caused by a sudden wind push. The method may also comprise applying to the determined fore-aft speed of the nacelle at least one filter for removing, from the determined fore-aft speed of the nacelle, frequencies different from those theoretically caused by a sudden wind push.

The application of these filters to the calculated difference of speeds and/or the determined fore-aft speed of the nacelle may permit obtaining even more improved reactions to estimated extreme conditions corresponding to real extreme conditions. Further, these filters may possibly avoid (unnecessary) reactions to estimated extreme conditions not corresponding to real extreme conditions.

The system for determining the fore-aft speed of the nacelle may comprise at least one accelerometer and/or at least one inclinometer mounted on the nacelle.

In another aspect, the invention provides a wind turbine configured to perform the method of operating a wind turbine as previously described.

BRIEF DESCRIPTION OF THE DRAWINGS

Particular embodiments of the present invention will be described in the following by way of non-limiting examples, with reference to the appended drawings, in which.

DETAILED DESCRIPTION OF EMBODIMENTS OF THE INVENTION

In the following description, numerous specific details are set forth in order to provide a thorough understanding of the present invention. It will be understood by one skilled in the art however, that the present invention may be practiced without some or all of these specific details. In other instances, well known elements have not been described in detail in order not to unnecessarily obscure the description of the present invention.

Figure 1:
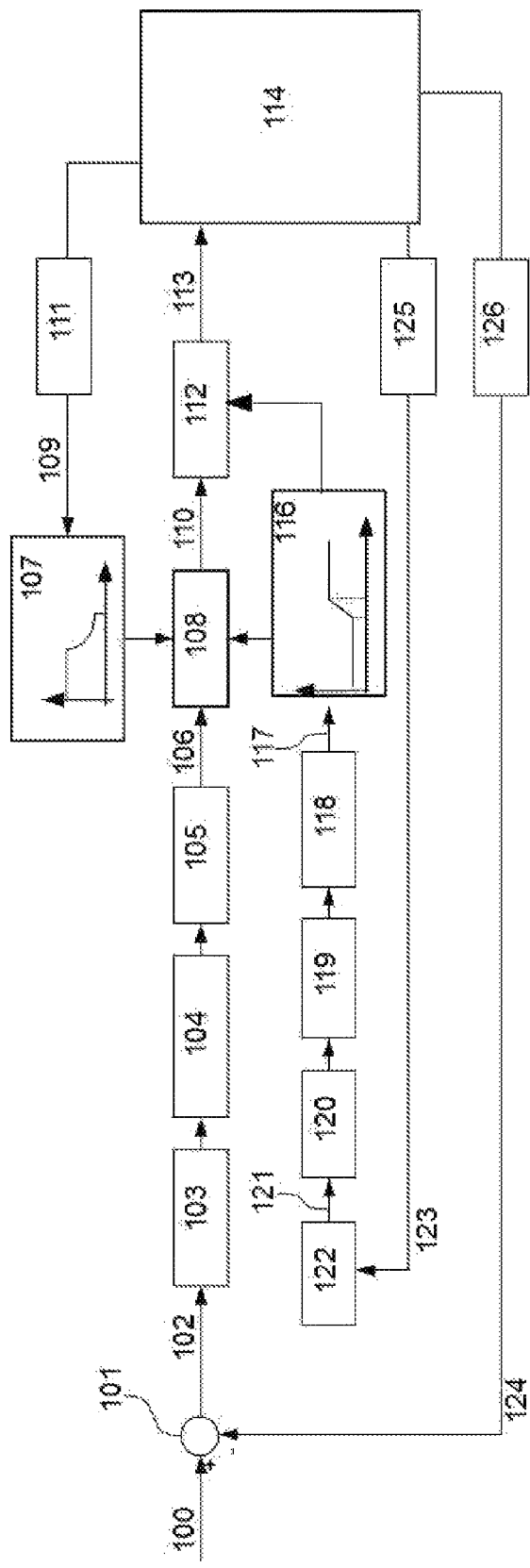
FIG. 1 is a block diagram illustrating a wind turbine system suitable for performing one or more methods provided by the invention.

FIG. 1 is a block diagram illustrating a wind turbine system suitable for performing examples of methods of operating a wind turbine provided by the invention. In particular, this figure shows a block representing a wind turbine 114 having a rotor with a plurality of blades, a nacelle, and other elements which are not particularly relevant in the context of the present invention. This figure also shows one or more pitch systems 112 for pitching the blades, a system 126 for determining a speed of the rotor, and a PID controller 108.

The one or more pitch systems 112 may comprise an individual pitch system for each blade or, alternatively, a collective pitch system for pitching all the blades. The system 126 for determining a speed of the rotor may comprise a system with one or more sensors to directly measure the speed of the rotor or, alternatively, a system for measuring the speed of a generator related to the rotor. In direct drive wind turbines, the rotor speed will correspond to the generator rotor speed, and in wind turbines employing a gearbox, there will generally be a fixed ratio between generator rotor speed and rotor speed.

This diagram also comprises a system 122, 125 for determining a fore-aft speed of the nacelle, wherein the block 125 may correspond to a sensor for obtaining an acceleration of the nacelle (e.g. an accelerometer arranged on the nacelle), and the block 122 may correspond to an integrator. FIG. 1 also shows several filters 118-120 for removing, from a determined fore-aft speed of the nacelle, frequencies different from those theoretically caused by a sudden wind push. For example, the filter 118 may be a low pass filter, the block 119 may comprise notch filters to remove 1 p, 3 p and 6 p excitations, and the block 120 may comprise notch filters for removing fore-aft first mode frequencies.

FIG. 1 further shows a module 101 for obtaining a difference between a determined speed of the rotor and a predefined speed of reference of the rotor, and several filters 103-105 for removing, from a difference between a determined speed of the rotor and a predefined speed of reference of the rotor, various frequencies different from those theoretically caused by a sudden wind push. For example, the block 103 may comprise notch filters to remove structural frequencies, the block 104 may comprise notch filters to remove 1 p, 3 p and 6 p excitations, and the block 105 may be a low pass filter.

In other embodiments, a selection of those filters (mentioned before), different filters, or further filters could be used.

The diagram of FIG. 1 also comprises a block 111 representing a system for determining blade pitch angles, a gain scheduler 107 for tuning the PID control 108 depending on determined pitch angles, and a further gain scheduler 116 for tuning the PID control depending on determined fore-aft speed of the nacelle. The gain scheduler 116 may also be in charge of adapting a maximum pitch rate at which the pitch systems 112 may be limited to act.

In other embodiments, only the gain scheduler 116 for tuning the PID control 108 depending on determined fore-aft speed of the nacelle could be used. In yet further embodiments, a separate gain scheduler 107 for tuning the PID control 108 depending on determined pitch angles could be present.

During operation of the wind turbine 114, up to three different processes may be continuously performed in parallel. A first process may comprise the module 126 continuously determining the speed 124 at which the rotor of the wind turbine is rotating. Each determined rotor speed 124 may be received by the block 101 for calculating a difference 102 between the determined rotor speed 124 and a rotor speed of reference 100. This calculated difference of speeds 102 may be correspondingly filtered by the blocks 103-105, and the filtered difference of speeds 106 may be received by the PID controller 108.

A second process may comprise the module 125 continuously sensing a nacelle acceleration 123, which may be used by the integrator 122 for obtaining a corresponding (fore-aft) speed of the nacelle 121 by integrating the received nacelle acceleration 123. Each determined fore-aft speed of the nacelle 121 may be filtered by the blocks 118-120, and the filtered speed of the nacelle 117 may be used by the gain scheduler 116 to obtain corresponding gain(s) to be used by the PID controller 108.

In alternative embodiments, the fore-aft speed of the nacelle 121 may be determined by means of an inclinometer (arranged on the nacelle) and suitable other module(s) for inferring the fore-aft speed of the nacelle 121 from corresponding measurements provided by the inclinometer.

When the PID controller 108 receives the filtered difference of speeds 106 and the gain(s), both substantially corresponding to the same time and same environmental conditions (e.g. wind conditions), the PID controller 108 may produce corresponding pitch commands 110. These pitch commands 110, depending on the filtered difference of speeds 106 (PID error) and tuned as a function of the fore-aft speed of the nacelle, may be used by the pitch actuators 112 for properly acting 113 on the blades pitch angle.

An aspect of tuning the PID control as a function of the fore-aft speed of the nacelle may be that extreme wind conditions (e.g. Mexican hat wind gusts) may be implicitly detected sooner (by the PID control), such that improved pitch commands may be generated (by the PID control) to reduce dangerous effects due to said extreme conditions. Said generation of pitch commands by the PID controller may cause a smoother (not sudden) adaptation of the wind turbine operation to the changing environmental conditions to which the turbine is submitted.

At the same time the gain scheduler 116 generates gain(s), said gain scheduler 116 may further generate a suitable signal for regulating a maximum pitch rate at which the pitch systems 112 may act. In this case, the pitch actuators 112 may be configured to work at different maximum pitch rates. A function similar to the one used for producing gains may be used to generate different maximum pitch rate values depending on the determined fore-aft speed of the nacelle. For instance, if the PID sensitivity is very much increased because a high speed of the nacelle has been detected, a given maximum pitch rate could reduce the effect of said increase of PID sensitivity. Therefore, a coordinated variation of PID sensitivity and maximum pitch rate may cause an optimum reaction by the wind turbine to different wind conditions. This optimum reaction may be in terms of both good performance and low wear/fatigue of the wind turbine.

A third process may comprise the block 111 measuring pitch angles of the blades and providing said measured pitch angles 109 to the gain scheduler 107, which may use said measured pitch angles 109 to compensate the PID control 108 for nonlinear aerodynamics. This last term refers to that a variation in the pitch angle may cause a variation in the aerodynamic torque, said two variations having a nonlinear relation which depends on the current pitch angle. Namely, achieving a given variation of aerodynamic torque (to control the rotor speed) requires a greater pitch angle variation the lower is the current pitch angle, and a smaller pitch angle variation the greater is the current pitch angle. This gain scheduler 107 may thus generate smaller gains for greater current pitch angles and greater gains for smaller current pitch angles.

Figure 2A:
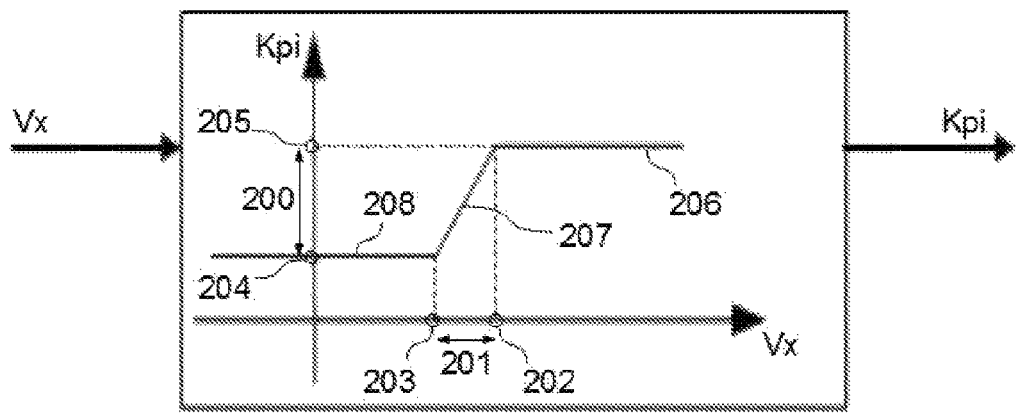
FIGS. 2a and 2b conceptually illustrate respective modules for generating Gains suitable for some implementations of methods provided by the invention.
Figure 2B:
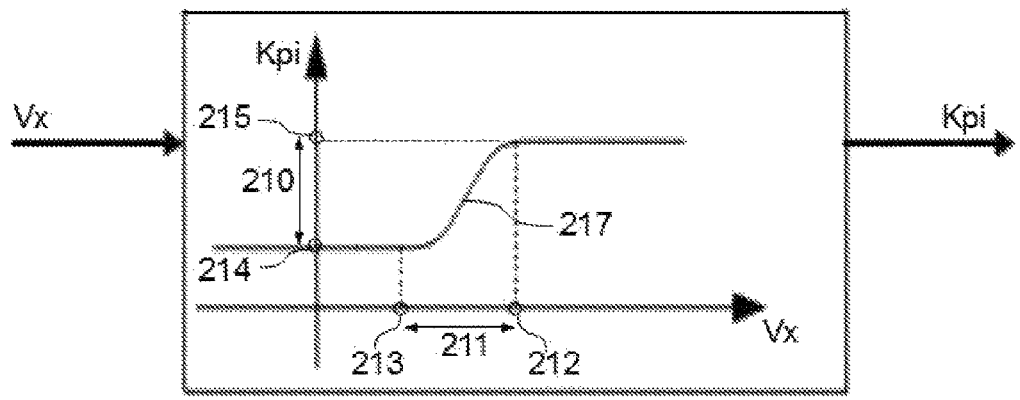

FIGS. 2*a* and 2*b* conceptually illustrate respective modules for generating gains suitable for some implementations of methods provided by the invention. These figures show the evolution of a single gain Kpi, which would be used to adapt both proportional and integral constants of the PID controller. According to these implementations, modified proportional and integral constants could be generated as follows:

$$P' = Kpi \times P,$$

$$I' = Kpi \times I,$$

where P' corresponds to the adapted proportional constant, I' corresponds to the adapted integral constant, and P and I correspond to the default proportional and integral constants of the PID control. In other words, P and I are the default values of the PID control that would be applied to the blade pitch control in a more conventional PID control. Note that this particular PID control proposed in the context of various embodiments could (temporarily) be reduced to a standard PID control if the single gain Kpi is (temporarily) fixed to one (Kpi=1).

FIG. 2*a* refers to a generator of gain(s) Kpi as a function of a determined nacelle fore-aft speed Vx. This generator implements a function in which a variable gain value (to be provided as gain Kpi) linearly increases 207 from the lower value 204 to the higher value 205 of a predefined range of gain values 200 as the determined nacelle fore-aft speed Vx increases from the lower value 203 to the higher value 202 of a predefined range of fore-aft speed values 201.

This function may also provide a substantially constant gain value Kpi, which may be substantially equal to the lower value 204 of the predefined range of gain values 200 when the determined nacelle fore-aft speed Vx is below the lower value 203 of the predefined range of fore-aft speed values 201. This function may also provide a substantially constant gain value Kpi, which may be substantially equal to the higher value 205 of the predefined range of gain values 200 when the determined fore-aft speed of the nacelle Vx is above the higher value 202 of the predefined range of fore-aft speed values 201.

FIG. 2*b* is similar to FIG. 2*a*. A difference is that, in the function of FIG. 2*b*, the variable gain value 217 (to be provided as gain Kpi) increases in a non-linear manner from the lower value 214 to the higher value 215 of a predefined range of gain values 210 as the determined nacelle fore-aft speed Vx increases from the lower value 213 to the higher value 212 of a predefined range of fore-aft speed values 211. The function of FIG. 2*b* may have been obtained from an equation relating the output gain value Kpi and the input nacelle fore-aft speed Vx, or by interpolating a greater number of points (Vx,Kpi). Note that the function of FIG. 2*a* can be defined by only two points (Vx,Kpi) linked by corresponding straight lines 206-208.

In both functions (of FIGS. 2*a* and 2*b*), the resulting gain Kpi may be used to calculate an adapted proportional gain constant P' from the default proportional gain constant P (P'=Kpi*P), and an adapted integral gain constant I' from the default integral gain constant I (I'=Kpi*I), of a corresponding PID controller 108 (see FIG. 1). Alternatively, the resulting gain Kpi may be used only to calculate an adapted proportional gain constant P' from the default proportional gain constant P (P'=Kpi*P).

Figure 3:
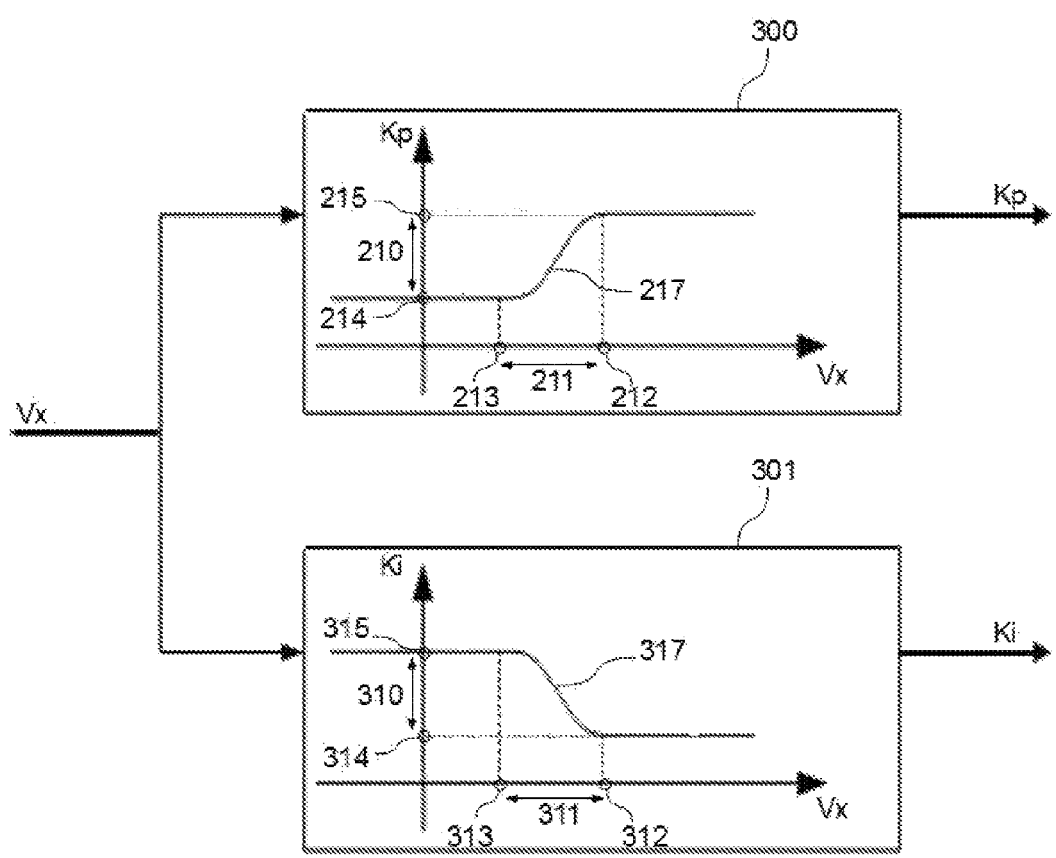
FIG. 3 conceptually illustrates another module for generating Gains suitable for other implementations of methods provided by the invention.

FIG. 3 conceptually illustrates another module for generating gains suitable for other implementations of methods provided by the invention. This generator of gains is based on two "gain" functions 300, 301. The first function 300 is very similar to the one shown in FIG. 2*b* (references of FIG. 2*b* have been kept in FIG. 3 for this function 300), whereas the second function 301 responds to other principles. In this case, the output Kp provided by the function 300 is to be used only as a gain to calculate an adapted proportional PID constant P' according to the formula P'=Kp×P, and the output Ki provided by the function 301 is to be used to calculate an adapted integral PID constant I' according to the formula I''=Ki×I, of a corresponding PID controller 108 (see FIG. 1). P and I refer to the default proportional and integral constants of the PID controller.

With respect to the second function 301, a variable gain value (to be provided as output Ki) decreases 317 from the higher value 315 to the lower value 314 of a predefined range of gain values 310 as the fore-aft speed of the nacelle Vx increases from the lower value 313 to the higher value 312 of a predefined range of fore-aft speed values 311. Further, the gain Ki is equal to the higher value 315 of the predefined range of gain values 310 when the nacelle fore-aft speed Vx is below the lower value 313 of the predefined range of nacelle fore-aft speed values 311, and the gain Ki is equal to the lower value 314 of the predefined range of gain values 310 when the nacelle fore-aft speed Vx is above the higher value 312 of the predefined range of fore-aft speed values 311.

Optionally, the predefined range of fore-aft speed values 211 of the "Kp(Vx)" function 300 and the predefined range of fore-aft speed values 311 of the "Ki(Vx)" function 301 may be substantially equal. In addition or alternatively to this, the predefined range of gain values 210 of the "Kp (Vx)" function 300 and the predefined range of gain values 310 of the "Ki(Vx)" function 301 may also be substantially equal.

Provision of an "increasing" gain Kp for adapting the proportional constant and a "decreasing" gain Ki for adapting the integral constant, may cause an attribution of greater weight to the PID control reaction due to the instantaneous error (i.e. proportional gain) and a smaller weight to the integral gain. An aspect of this implementation is that a faster actuation (by the PID control on pitch adjustments) may be achieved in transients (non-steady states) due to extreme conditions.

In FIGS. 2a, 2b and 3, positive fore-aft speeds of the nacelle Vx are to be understood as "rearward" speeds of the nacelle, i.e. speeds of the nacelle when the wind pushes the nacelle backward. On the contrary, negative fore-aft speeds of the nacelle Vx are to be understood as "forward" speeds of the nacelle, i.e. speeds of the nacelle when the nacelle is moving forward as consequence of a rebound caused by the first push of the wind. In some embodiments, gains Kpi, Kp, Ki to adapt the sensitivity of the PID control may be calculated and applied to the PID control only when the speed of the nacelle Vx is positive. This way, the method will act on the operation of the wind turbine only when the nacelle is moving backwards, which means that this actuation is optimally anticipated from the very first moment the nacelle moves backward when pushed by the wind (in a e.g. sudden wind gust).

In alternative embodiments, gains Kpi, Kp, Ki to adapt the sensitivity of the PID control may also be calculated and applied to the PID control when the speed of the nacelle Vx is negative. This implies that the method will also act on the operation of the wind turbine when the nacelle is moving forwards. In some situations, however, the effect of the generated actuation could be rather unhelpful, even though beneficial effects could be obtained in others. In said alternative embodiments, gain values may be different depending on the sign of Vx because different PID sensitivities may be required to improve the control of the wind turbine in either "forward" or "rearward" movement.

The functions illustrated by FIGS. 2a, 2b and 3 may be obtained from theoretically calculated gain values depending on theoretically calculated nacelle fore-aft speed values. These calculations may be based on simulations taking into account a theoretical model of the wind turbine. For example, a Finite Element Method (FEM) may be used for calculating said values to define the corresponding "gain versus nacelle speed" function(s). In addition or alternatively to these calculated theoretical values, the gain values depending on nacelle fore-aft speed values may be experimentally obtained by measuring necessary parameters under controlled conditions.

In an exemplary implementation of a "Kpi(Vx)" function (such as the ones shown in FIGS. 2a and 2b), or a "Kp(Vx)" function (such as the one shown in FIG. 3), or a "Ki(Vx)" function (such as the one shown in FIG. 3), the predefined range of gain values and range of fore-aft speed values can be defined as follows. The low value of the predefined range of gain values may be equal to 1, whereas the high value of the same range may be equal to 1.5. The low value of the predefined range of fore-aft speed values may be equal to or close to 0.15 m/s, whereas the high value of the same range may be equal to or close to 0.30 m/s.

Figure 4:
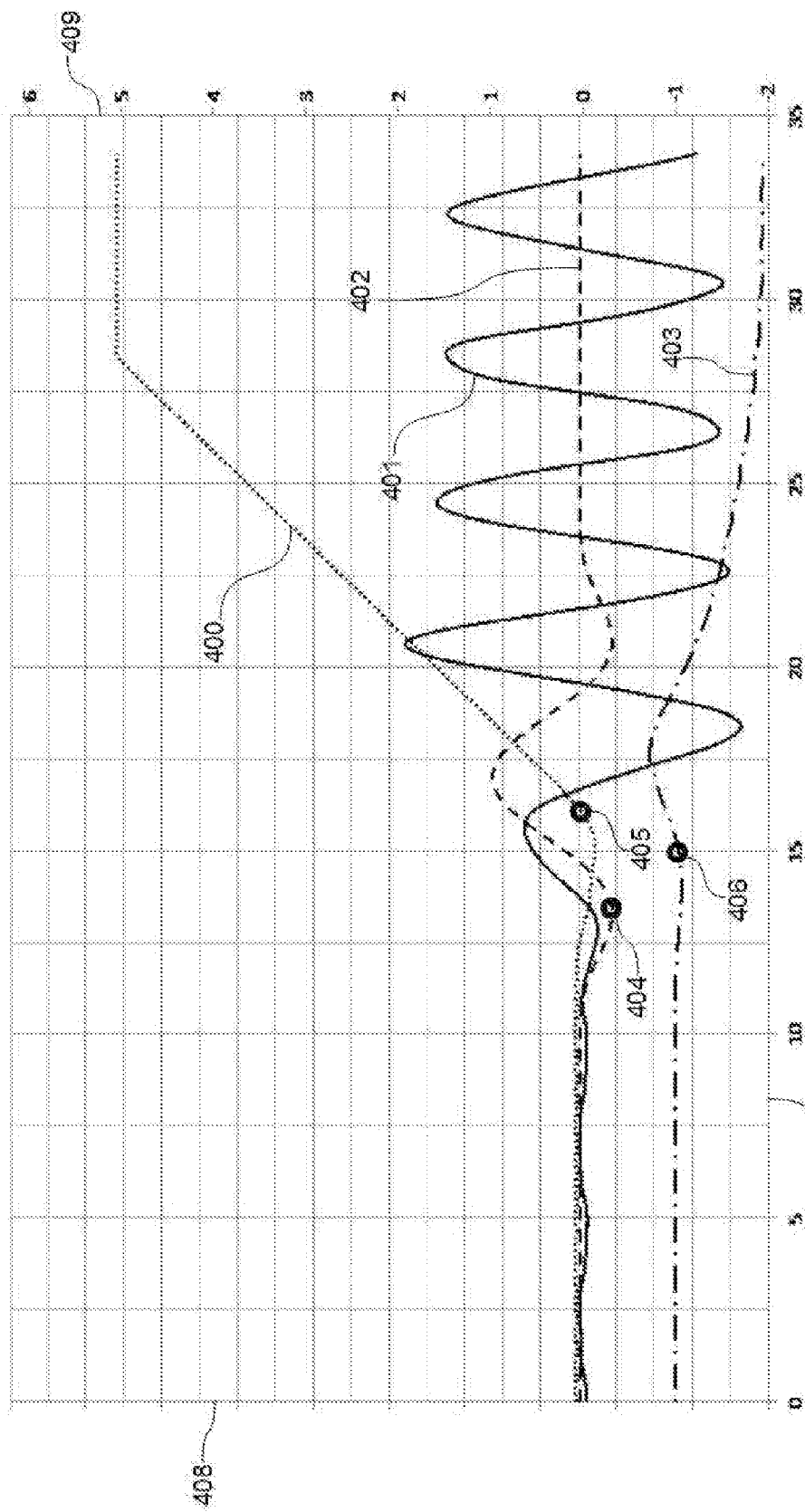
FIG. 4 graphically represents a conventional wind turbine control in case of a Mexican hat wind gust.

FIG. 4 graphically represents a conventional wind turbine control in case of a Mexican hat wind gust. A first axis 407 corresponds to a time scale (in seconds), a second axis 408 corresponds to a scale combining wind speed (in m/s), rotor speed (in rpm) and pitch angle (in degrees), and a third axis 409 corresponds to a nacelle fore-aft speed scale (in m/s). In this graphic, four different curves 400-403 are shown representing the evolution over time of respective parameters related to a conventional wind turbine operation under wind conditions comprising a wind gust.

A first of said parameters is the hub longitudinal wind speed 402, a second of said parameters is the rotor speed 403, a third parameter is the pitch angle of one of the blades 400, and a fourth of said parameters corresponds to the fore-aft speed of the nacelle 401. FIG. 4 illustrates the point at which the wind starts rising up and the nacelle starts moving backwards 404, the point at which the rotor speed starts rising up and also the pitch angle 406, and the point at which the pitch actuator reaches the maximum pitch rate 405.

FIG. 4 reflects a situation in which the loads on the blades and tower may be high because the wind speed 402 firstly drops and makes the generator speed 403 and pitch angle 400 go down, then the wind speed suddenly rises 404 and the wind hits the turbine with a relatively low pitch angle. This means that the thrust force will be high, possibly leading to extreme blade root and tower base loads. This type of load cases usually also leads to a rotor over speed that cannot be avoided since the pitch actuator already reaches its limit at point 405, and thus frequently leads to a turbine stop. In some cases, however, it may not be necessary to interrupt the operation of the wind turbine.

Applying embodiments of the method, according to e.g. the previous descriptions, may provide different advantages to the control of operation of the wind turbine in situations similar to the one reflected by FIG. 4. In particular, the detection of a wind gust may be anticipated (at the point 404) and the pitch actuation accordingly advanced (at a point closer to the point 404 than the point 406). As this anticipation is performed by means of a PID control tuned as a function of the nacelle fore-aft speed, the reaction of the wind turbine to a wind gust may be implemented in a smoother (less sudden) manner in comparison with prior art systems/methods.

Applying embodiments of the method in which the maximum pitch rate is adjusted depending on the nacelle fore-aft velocity may provide further advantages. For instance, the maximum pitch rate reached at point 405 may be temporarily exceeded during the wind gust. On one hand, increasing the maximum pitch rate may cause mechanical wear/fatigue of the wind turbine (since e.g. pitch systems acts faster), but, on other hand, loads due to an unsuitable facing of the wind gust may be reduced, which, in turn, may reduce mechanical wear/fatigue. This last reduction of mechanical wear/fatigue is considered to be quite greater in absolute terms than the punctual increase of mechanical wear/fatigue due to temporarily increasing the maximum pitch rate (to obtain a faster pitch response).

Figure 5A:
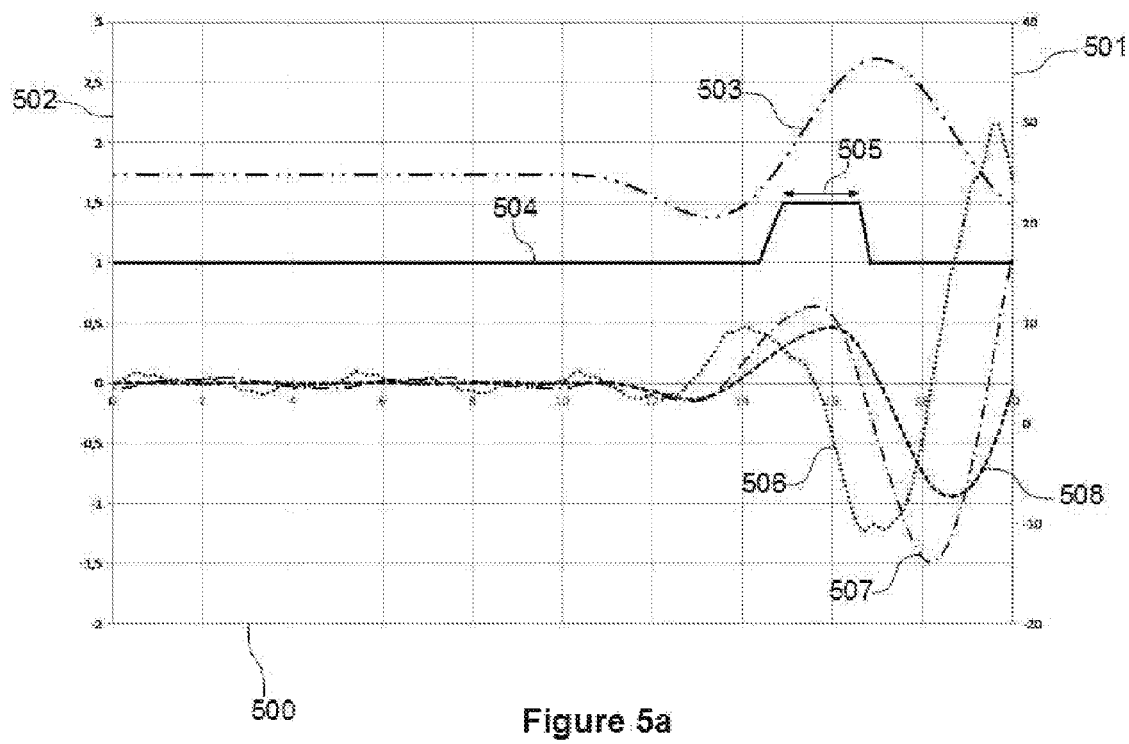
FIGS. 5a and 5b graphically represents a wind turbine control applying embodiments of the invention to situations similar to the one shown in FIG. 4.
Figure 5B:
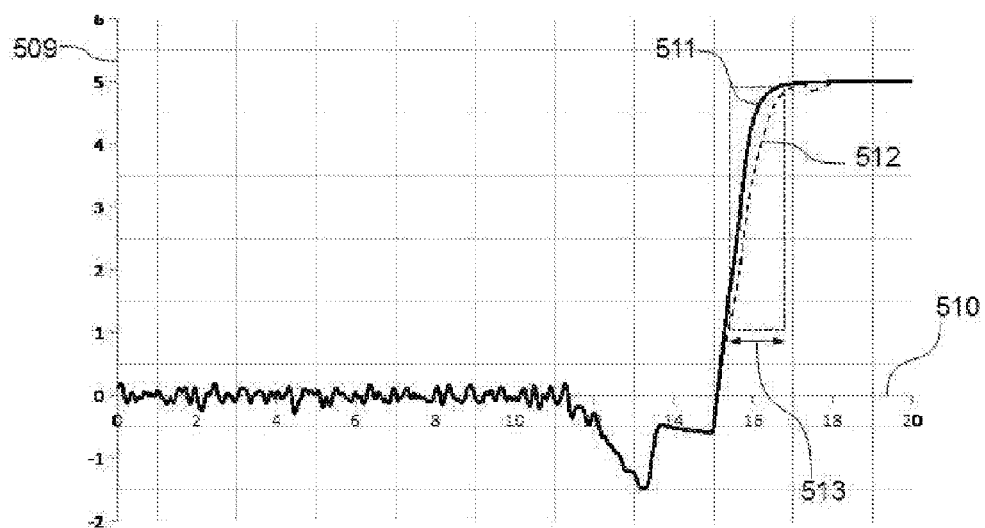

FIGS. 5a and 5b graphically represents a wind turbine control applying embodiments of the invention to situations similar to the one shown in FIG. 4.

With respect to FIG. 5a, a first axis 500 corresponds to a time scale (in seconds), a second axis 502 corresponds to a scale combining nacelle x-acceleration (in m/s$^2$), estimated nacelle x-speed (in m/s), filtered nacelle x-speed (in m/s), and gain value (provided by a gain scheduler), and a third axis 501 corresponds to a wind speed scale (in m/s). In this graphic, five different curves 503-504 and 506-508 are shown representing the evolution over time of respective parameters related to a wind turbine operation with an anticipated control according to embodiments of the invention, and under wind conditions comprising a DLC 1.6 case. In particular, a wind gust at 25 m/s approaches the wind turbine.

A first of said parameters is the nacelle x-acceleration 506, a second parameter is the estimated nacelle x-speed 507, a third parameter is the filtered nacelle x-speed 508, a fourth parameter is the gain value 504 (for calculating adapted proportional and integral constants to be provided to a PID controller), and a fifth parameter is the wind speed 503. FIG. 5a illustrates how the gain value 504 changes from 1 to 1.5 depending on the filtered nacelle speed estimation 508, and how the value of 1.5 is maintained during a certain time interval 505. This gain of 1.5 during this interval 505 directly multiplies the (proportional and integral) PID constants, increasing its performance (sensitivity) and therefore the requested pitch actuation. Note that when the Gain value 504 is equal to 1, the proportional and the integral constants of the PID control exhibit their default values, i.e. the value they would have outside embodiments of the present invention.

The effect of this increased PID sensitivity (performance) is illustrated by FIG. 5b. This graphic shows a first axis 509 corresponding to a pitch rate scale (in degrees/s), and a second axis 510 corresponding to a time scale. Two curves 511, 512 are also shown: a curve 511 corresponding to the evolution of the pitch rate 509 over time 510 resulting from an anticipated control according to an embodiment of the invention, and a curve 512 corresponding to the evolution of the pitch rate 509 over time 510 resulting from a conventional control. It is clearly reflected that the anticipated control (according to this embodiment of the invention) causes an increased performance and faster actuation on the pitch angles, which occurs during the time interval with higher Gain 513 (or 505 in FIG. 5a).

In the various descriptions provided herein, references to modules, blocks and other similar terms have been made. In alternative examples, some of the described modules or blocks may be integrated in a single module or block. These modules (and possibly required connections between them) may be implemented physically. Nevertheless, in alternative implementations, the functionalities performed by said modules (and possibly connections) may also be implemented logically by e.g. suitably programming a programmable control unit, such as e.g. a PLC (Programmable Logic Controller). A module or block may thus be defined as a piece of hardware and/or software implementing one or more functionalities. For example, with respect to FIG. 1, the block or module 112 (pitch actuators) will primarily be hardware based, even though some very little software could be included to give some "intelligence" to the main hardware part. On the contrary, the block or module 116 (gain scheduler) may primarily be software based, since its performance is founded on calculations.

Although only a number of particular embodiments and examples of the invention have been disclosed herein, it will be understood by those skilled in the art that other alternative embodiments and/or uses of the invention and obvious modifications and equivalents thereof are possible. Furthermore, the present invention covers all possible combinations of the particular embodiments described. Thus, the scope of the present invention should not be limited by particular embodiments, but should be determined only by a fair reading of the claims that follow.

The invention claimed is:

1. A method of operating a wind turbine having a rotor with a plurality of blades, a nacelle, one or more pitch systems for pitching the blades, a system for determining a speed of the rotor, and a system for determining a fore-aft speed of the nacelle;

the method comprising:
determining the speed of the rotor;
determining the fore-aft speed of the nacelle;
calculating a difference between the determined speed of the rotor and a predefined speed of reference of the rotor;
obtaining pitch commands by performing a PID control of the calculated difference of speeds, wherein the PID control is tuned for adapting the sensitivity of the PID control as a function of the determined fore-aft speed of the nacelle; and
the one or more pitch systems pitching the blades in accordance with the obtained pitch commands.

2. A method according to claim 1, wherein tuning the PID control for adapting the sensitivity of the PID control as a function of the determined fore-aft speed of the nacelle comprises obtaining a first gain as a function of the determined fore-aft speed of the nacelle, and tuning the PID control by applying the obtained first gain to the PID control.

3. A method according to claim 2, wherein the first gain is equal to a first variable gain value, which continuously increases from a lower value to a higher value of a first predefined range of gain values as the determined fore-aft speed of the nacelle increases from a lower value to a higher value of a first predefined range of fore-aft speed values.

4. A method according to claim 3, wherein the first gain is equal to the lower value of the first predefined range of gain values when the determined fore-aft speed of the nacelle is below the lower value of the first predefined range of fore-aft speed values; and wherein the first gain is equal to the higher value of the first predefined range of gain values when the determined fore-aft speed of the nacelle is above the higher value of the first predefined range of fore-aft speed values.

5. A method according to claim 4, wherein applying the obtained first gain to the PID control comprises applying the obtained first gain to the PID control for adapting both the proportional constant and the integral constant of the PID control.

6. A method according to claim 4, wherein tuning the PID control for adapting the sensitivity of the PID control as a function of the determined fore-aft speed of the nacelle further comprises obtaining a second gain as a function of the determined fore-aft speed of the nacelle, and tuning the PID control by further applying the obtained second gain to the PID control.

7. A method according to claim 3, wherein applying the obtained first gain to the PID control comprises applying the obtained first gain to the PID control for adapting both a proportional constant and an integral constant of the PID control.

8. A method according to claim 3, wherein tuning the PID control for adapting the sensitivity of the PID control as a function of the determined fore-aft speed of the nacelle further comprises obtaining a second gain as a function of the determined fore-aft speed of the nacelle, and tuning the PID control by further applying the obtained second gain to the PID control.

9. A method according to claim 2, wherein applying the obtained first gain to the PID control comprises applying the obtained first gain to the PID control for adapting both a proportional constant and an integral constant of the PID control.

10. A method according to claim 2, wherein tuning the PID control for adapting the sensitivity of the PID control as a function of the determined fore-aft speed of the nacelle further comprises obtaining a second gain as a function of the determined fore-aft speed of the nacelle, and tuning the PID control by further applying the obtained second gain to the PID control.

11. A method according to claim 10, wherein the second gain is equal to a second variable gain value which continuously decreases from a higher value to a lower value of a second predefined range of gain values as the determined fore-aft speed of the nacelle increases from a lower value to a higher value of a second predefined range of fore-aft speed values.

12. A method according to claim 11, wherein the second gain is equal to the higher value of the second predefined range of gain values when the determined fore-aft speed of the nacelle is below the lower value of the second predefined range of fore-aft speed values; and wherein the second gain is equal to the lower value of the second predefined range of gain values when the determined fore-aft speed of the nacelle is above the higher value of the second predefined range of fore-aft speed values.

13. A method according to claim 11, wherein applying the obtained first gain to the PID control comprises applying the obtained first gain to the PID control for adapting a proportional constant of the PID control; and wherein applying the obtained second gain to the PID control comprises applying the obtained second gain to the PID control for adapting an integral constant of the PID control.

14. A method according to claim 10, wherein applying the obtained first gain to the PID control comprises applying the obtained first gain to the PID control for adapting a proportional constant of the PID control; and wherein applying the obtained second gain to the PID control comprises applying the obtained second gain to the PID control for adapting an integral constant of the PID control.

15. A method according to claim 1, wherein the one or more pitch systems are adapted to follow pitch commands under a maximum pitch rate; and wherein the method further comprises adapting the maximum pitch rate as a function of the determined fore-aft speed of the nacelle.

16. A method according to claim 1, wherein the wind turbine further comprises a system for determining blade pitch angles; wherein the method further comprises determining the blade pitch angles; and wherein the PID control is further tuned in accordance with the determined blade pitch angles.

17. A method according to claim 1, further comprising applying to the calculated difference of speeds at least one filter for removing, from the calculated difference of speeds, frequencies different from those theoretically caused by a sudden wind push.

18. A method according to claim 1, further comprising applying to the determined fore-aft speed of the nacelle at least one filter for removing, from the determined fore-aft speed of the nacelle, frequencies different from those theoretically caused by a sudden wind push.

19. A method according to claim 1, wherein the system for determining the fore-aft speed of the nacelle comprises at least one accelerometer and/or at least one inclinometer.

20. A wind turbine configured to perform the method according to claim 1.

* * * * *